US007747752B2

(12) United States Patent
Pedersen

(10) Patent No.: US 7,747,752 B2
(45) Date of Patent: Jun. 29, 2010

(54) SYSTEMS AND METHODS FOR MANAGING ELECTRONIC COMMUNICATIONS USING VARIOUS NEGOTIATION TECHNIQUES

(75) Inventor: Elin R. Pedersen, Redwood City, CA (US)

(73) Assignee: Fuji Xerox Co., Ltd., Tokyo (JP)

(*) Notice: Subject to any disclaimer, the term of this patent is extended or adjusted under 35 U.S.C. 154(b) by 881 days.

(21) Appl. No.: 09/984,505

(22) Filed: Oct. 30, 2001

(65) Prior Publication Data

US 2002/0069249 A1 Jun. 6, 2002

Related U.S. Application Data

(60) Provisional application No. 60/247,990, filed on Nov. 14, 2000.

(51) Int. Cl.
*G06F 15/173* (2006.01)

(52) U.S. Cl. ...................................................... 709/227

(58) Field of Classification Search ......... 709/201–253; 364/401; 713/400; 707/201

See application file for complete search history.

(56) References Cited

U.S. PATENT DOCUMENTS 5,519,606 A * 5/1996 Frid-Nielsen et al. .......... 705/9
5,872,841 A 2/1999 King et al.
6,088,717 A * 7/2000 Reed et al. .................. 709/201
6,101,480 A * 8/2000 Conmy et al. .................. 705/9
6,160,877 A * 12/2000 Tatchell et al. .............. 379/197
6,308,201 B1 * 10/2001 Pivowar et al. .............. 709/214
6,438,216 B1 * 8/2002 Aktas ...................... 379/88.01
6,457,062 B1 * 9/2002 Pivowar et al. .............. 709/248
6,580,787 B1 * 6/2003 Akhteruzzaman et al. ...................... 379/88.22
6,640,230 B1 * 10/2003 Alexander et al. ............ 707/10
6,842,512 B2 * 1/2005 Pedersen ............... 379/142.01
7,164,759 B2 * 1/2007 Lebowitz et al. ....... 379/142.03
7,200,215 B2 * 4/2007 Brown et al. ........... 379/210.01
7,209,916 B1 * 4/2007 Seshadri et al. ................ 707/3

FOREIGN PATENT DOCUMENTS

JP 9205495 A 8/1997
JP 2000134336 A 5/2000

OTHER PUBLICATIONS

Japanese Office Action dated May 1, 2007 Issued in Corresponding Japanese Patent Application 2002-303681.
Japanese Office Action dated Jul. 15, 2008 Issued in Corresponding Japanese Patent Application 2002-303681.
Japanese Office Action dated Aug. 15, 2009 Issued in Corresponding Japanese Patent Application 2002-303681.
Translation of Office Action dated May 1, 2007 Issued in Corresponding Japanese Patent Application 2002-303681, dated Jul. 15, 2008 Issued in Corresponding Japanese Patent Application 2002-303681, dated Aug. 15, 2009 Issued in Corresponding Japanese Patent Application 2002-303681.

* cited by examiner

*Primary Examiner*—J Bret Dennison
(74) *Attorney, Agent, or Firm*—Sughrue Mion, PLLC

(57) ABSTRACT

Systems and methods for negotiating a future communication are provided to facilitate interaction between persons who wish to interact but who presently may not be in a position or find it desirable to do so. Each party may be provided with an interaction manager that allows the parties to negotiate future time(s) for future communication by ascertaining mutually available free time and selecting from among these times. The parties may also elect to defer a communication until a particular communication channel becomes available.

12 Claims, 10 Drawing Sheets

CALLER 110
120
INTERACTION MANAGER 130
140
COMMUNICATION INFRASTRUCTURE 150
160
INTERACTION MANAGER 180
170
CALLEE 190
100

SYSTEMS AND METHODS FOR MANAGING ELECTRONIC COMMUNICATIONS USING VARIOUS NEGOTIATION TECHNIQUES

CROSS REFERENCE TO RELATED APPLICATIONS

This application is related to U.S. Provisional Application Ser. No. 60/247,990 filed Nov. 14, 2000, from which priority is claimed.

BACKGROUND OF THE INVENTION

1. Field of Invention

This invention relates to techniques for negotiating a future communication.

2. Description of Related Art

Despite the proliferation of communication technology, there remains the stubborn problem of finding a mutually available time to interact. That is, although people have many more options for communicating than ever before, simply finding a good time to interact with one another can be difficult.

To appreciate this difficulty, consider what typically happens when a caller tries to reach another person whose communication device is in use. In this situation, a communication network usually only provides the caller with a busy signal. Of course, the caller may attempt to call again at some later point but there may be no way of knowing a good time to contact the other party. Thus, interaction at the later point may likewise fail.

Although conventional technology has provided various means for allowing a caller to leave a message, it still can be frustrating dealing with these systems. For example, a caller may leave a voice mail message in a voice mail system and the recipient may thereafter attempt to respond to the message by calling back. However, frequently what happens is that when the message is returned, the caller who left the original message is no longer available.

SUMMARY OF THE INVENTION

Accordingly, there exists a need for systems and methods that allow the parties to negotiate a future time for communication in order to avoid these difficulties.

This invention provides various systems and methods for managing electronic communication using various techniques to negotiate a future communication.

In various exemplary embodiments of the systems and methods of this invention, the parties may negotiate a time for communication. The time period for communication may be determined by selecting from among mutually available time periods determined from information obtained from one or more calendar systems. In another exemplary embodiment, a caller may request a deferred communication with a callee until a specified communication channel becomes available.

In various exemplary embodiments, an interaction manager provides interaction information as an interaction space displayed or otherwise presented on a Web-enabled device, such as a Web-enabled telephone, or otherwise output to the user using any human perceptible technique, such as auditory, haptic or the like.

Furthermore, the interaction space may include visibility information that informs a caller about the status of a callee, accessibility information that provides the caller with a list of communication channels available to the caller, and continuity information that includes information and action facilitation data that reflects the ongoing interaction between the caller and the callee. Furthermore, the interaction manager may determine a response message for a caller at least in part based on the relation of the caller and the callee and the current status of the callee.

In an exemplary embodiment, a first interaction manager may receive a request for future communication from a second interaction manager and then obtain schedule information for each of the parties associated with these interaction managers from one or more calendar systems to determine an optimal time period for the future communication. Alternatively, a first interaction manager may receive a request for deferred communication from a second interaction manager that involves a request for notifying a first party associated with the first interaction manager when a particular communication channel has become available.

These and other features and advantages of this invention are described in, or are apparent from, the detailed description of various embodiments of the systems and methods according to this invention.

BRIEF DESCRIPTION OF THE DRAWINGS

Various exemplary embodiments of this invention are described in detail with reference to the following figures, where like numerals reference like elements, and wherein.

DETAILED DESCRIPTION OF PREFERRED EMBODIMENTS

Figure 1:
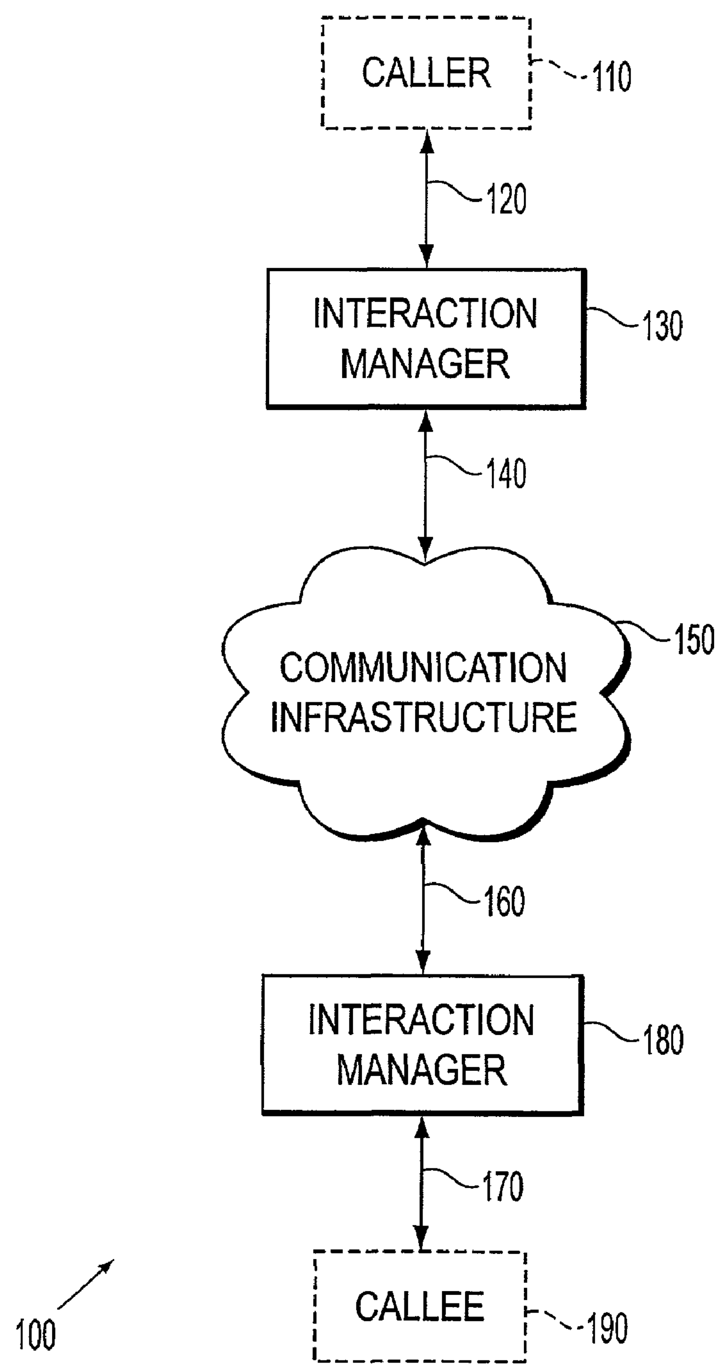
FIG. 1 is a block diagram of one exemplary embodiment of a system that manages electronic communications using various techniques for negotiating a future communication.

FIG. 1 is a block diagram of one exemplary embodiment of a system 100 that manages electronic communications using various techniques for negotiating a future communication. The electronic communication system 100 includes one or more interaction managers, such as the interaction managers 130 and 180. These components are coupled together via a communication infrastructure 150 through the links 140 and 160.

The communication infrastructure 150 can accommodate communication between the interaction managers 130 and 180 by providing a communication path capable of transmitting and receiving communication signals between the links 140 and 160. The communication infrastructure 150 can include any known or later developed network for transmitting information. Such networks can include any combination of wide area networks, local area networks, public switched telephone networks, wireless or wired networks, intranets, the Internet or any other distributed processing network or system. In general, the communication infrastructure 150 can be any known or later developed combination of systems, computer programs or structures usable to transmit and receive information over the links 140 and 160.

The links 140 and 160 can be any known or later developed device or system for transmitting data between the interaction managers 130 and 180 and the communication infrastructure 150. Such devices include direct serial/parallel cable connections, satellite links, wireless links, connections over a wide area network or a local area network, connections over a public switched telephone system, connections over an intranet, connections over the Internet or connections over any other distributed processing network or system. Additionally, the links 140 and 160 can be software devices linking various software systems. In general, the links 140 and 160 can be any known or later developed devices or systems, computer programs or structures usable to connect the interaction manager 130 and the interaction manager 180 to the communication infrastructure 150.

Figure 2:
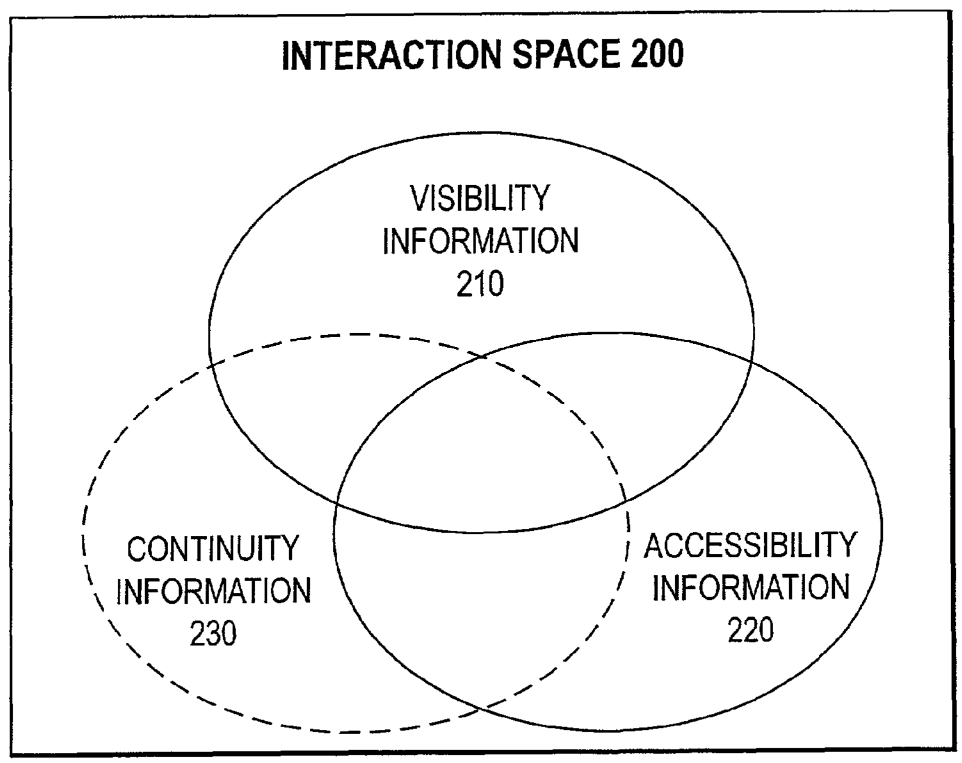
FIG. 2 is an exemplary diagram of an interaction space.

In various exemplary embodiments, the interaction managers 130 and 180 can be coupled to communication devices (not shown) such as a Web-enabled telephone (a webphone), a cellular telephone, a standard telephone, a personal digital assistant ("PDA"), a two-way pager, a facsimile machine or program, or a network-attached personal computer. The interaction managers 130 and 180 provide such communication devices with a response message. In most cases, this response message will be implemented as an interaction space. FIG. 2 shows one exemplary embodiment of an interaction space according to this invention.

Various exemplary embodiments of an interaction managers 130 and 180 used in conjunction with this invention are disclosed in U.S. patent application Ser. No. 09/794,102, filed Feb. 28, 2001, which is incorporated herein by reference in its entirety.

The interaction manager 180 is capable of providing a caller 110, who is associated with at least one communication device, with a set of one or more communication channels usable to interact with a callee 190, along with information about the current status of the callee 190. The caller 110 can then make an informed choice of which provided communication channel to use to contact the callee 190, based on the interpretation by the caller 110 of the status of the callee 190. The list of communication channels can be implemented using, for example, hypertext links that point to addresses of other communication devices or that point to locations capable of directing communications to these devices.

The interaction managers 130 and 180 are able to generate one or more personalized interaction spaces 200. As shown in FIG. 2, a single interaction space 200 reflects the relationship between a caller 110, who is the owner of the interaction space 200, and a callee 190, who uses the interaction space 200. In various exemplary embodiments of the methods and systems of this invention, each of the interaction managers 130 and 180 is implemented as a distributed system having software components residing on a Web server. These software components interact with other individuals, or with other interaction managers that reside on one or more Web servers.

Generally, a caller 110 associated with a communication device can interact with or obtain interaction information about a callee 190 associated with the interaction manager 180. For example, a caller 110, using a webphone, may connect with a callee 190 associated with the interaction manager 180. In this case, the communication infrastructure 150 can include the Internet. Once the caller 110 connects with the callee's interaction manager 180, various information can be provided to the caller 110. In particular, the interaction manager 180 can display information contained in an interaction space, such as that shown in FIG. 2.

Depending on the relation between the caller 110 and the callee 190, and the current status of the callee 190, the interaction manager 180 can provide personalized information to the caller 110, such as a set of links to various communication devices associated with the callee 190. For example, the interaction manager 180 may provide one or more links to one or more of a webphone, a telephone, a pager, a facsimile device, an electronic mail (e-mail) system, and a scheduler/calendar system. In addition, the interaction manager 180 may provide information as to the availability of the callee 190, such as, for example, a message indicating that the callee 190 is tied up in an important meeting. However, the information that is displayed or otherwise output or presented via the interaction manager 180 may be based upon the relationship between the parties. That is, the callee 190 may wish to only provide certain information such as, for example, home telephone number of the callee 190 to a certain group of persons who have been registered as friends of the callee 190.

The interaction manager 180 is capable of determining the identity of the caller 110 associated with a communication using various identifying technologies, such as automatic number identification (ANI), a cookie file, and various biometric devices (e.g., a fingerprint recognition device, an iris scan device). Once the identifier has been determined, the interaction manager 180 can determine the appropriate information that the identified caller 110 is entitled to access.

The caller 110 may be interested in interacting with the callee 190 either at the current moment or at some future time period. If the interaction manager 180 presents information to the caller 110 indicating that the callee 190 is currently unavailable, the caller 110 has the option of seeking future communication with the callee 190, by negotiating a particular time in which to communicate, or by deferring communication until a particular communication channel becomes available. Likewise, even if the callee 190 is currently available and one or more communication channels are free, the caller 110 may still negotiate a future communication with the callee 190 and/or elect to request a deferral of the communication until a particular desired communication channel becomes available.

It should be appreciated that the time for the future communication can be very precisely defined as a particular time interval having a defined beginning time and either a defined ending time or a defined period, length or extent. Alternatively, the time can be less precisely defined, such as "tomorrow", "next week", "Wednesday afternoon" or any other desired manner of defining a future time that is sufficiently specific enough that the caller and callee will be able to complete the negotiated future communication.

FIG. 2 is a block diagram graphically illustrating one exemplary embodiment of the interaction space 200 according to this invention. As shown in FIG. 2, the interaction space 200 includes visibility information 210, accessibility information 220, and continuity information 230. The visibility information 210 informs a caller 110 about the status or situation of a callee 190. The accessibility information 220 provides the caller 110 with a list of communication channels that the callee 190 has decided to make available to that particular caller 110. The continuity information 230, for example, can contain information and action facilitation data that reflect the ongoing interactions between that caller 110 and the callee 190. However, it should be appreciated that the interaction space 200 does not necessarily need to include the continuity information 230.

The information contained in the interaction space 200 is presented to the caller in a modality that is suited to the particular communication device being used by the caller 110. In various exemplary embodiments, the interaction space 200 is generated by integrating the visibility information 210, the accessibility information 220, and the continuity information 230.

Figure 3:
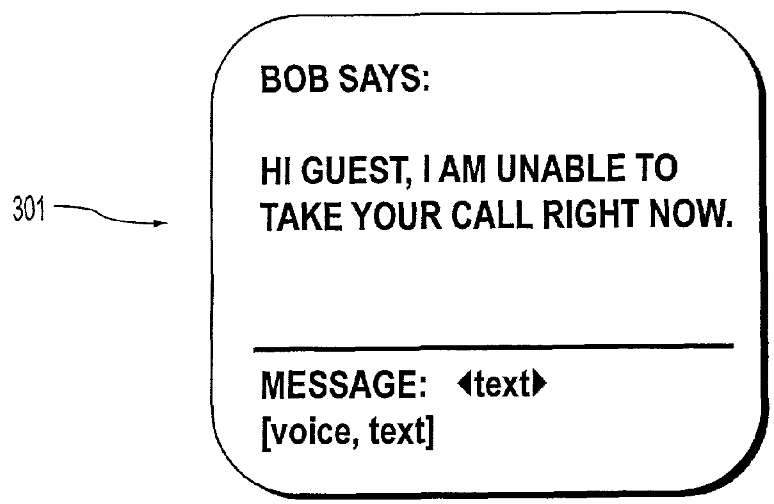
FIGS. 3 and 4 show two exemplary communication devices illustrating the use of interaction spaces according to this invention.
Figure 4:
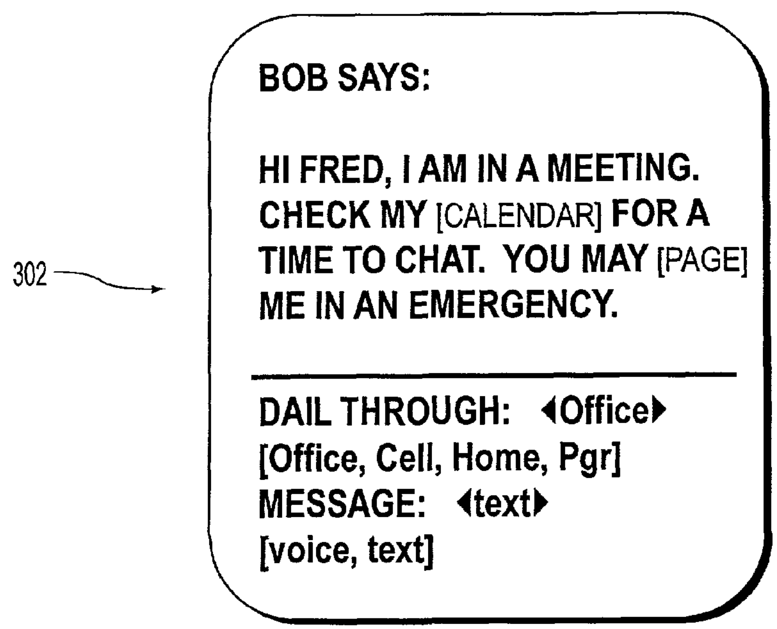

FIGS. 3 and 4 show two exemplary devices capable of displaying information, contained in the interaction space 200, to a caller 110 or to a callee 190. Although each communication device is capable of displaying the interaction space 200 to any caller 110, or to the callee 190, the content of the interaction space 200 may differ depending on the identity of a particular caller 110. For example, as shown in FIG. 3, the information, contained in the interaction space 200, that is displayed on the first communication device 301 includes a general message that the callee 190 can provide to any caller 110. However, as shown in FIG. 4, the information, contained in the interaction space 200, that is displayed on the second communication device 302 includes information contained in the interaction space 200 that is specifically tailored to a particular caller 110, and provides a greater degree of detail and specificity. Because the information that is contained in the interaction space 200 and displayed on the second communication device 302 can be customized for a particular caller, the information contained in the interaction space 200, that is displayed on the second communication device 302 can enhance the interaction between the caller 110 and the callee 190.

In various exemplary embodiments, the interaction space 200 can include links to available communications channels a particular caller 110 can access. For example, these available communication channels can be grouped into or represented entirely as logical interaction channels based on the situation and needs of a particular caller 110. However, the set of communication channels available to a caller 110 may depend on the status of the callee 190. For example, if the callee 190 is in a meeting, the callee 190 may not allow any direct calls.

Figure 5:
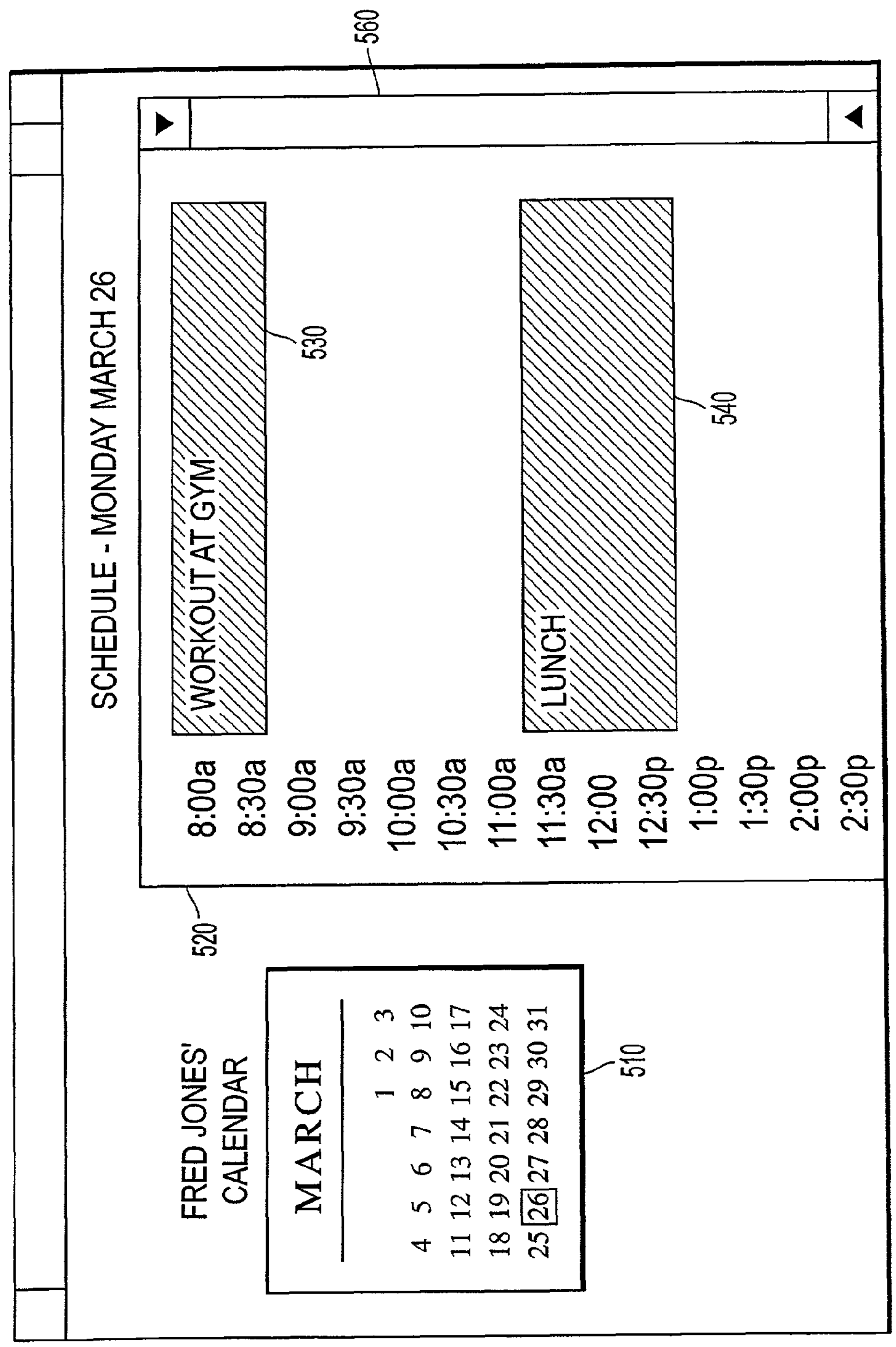
FIGS. 5 and 6 illustrate exemplary schedule information associated with two users of the system.
Figure 6:
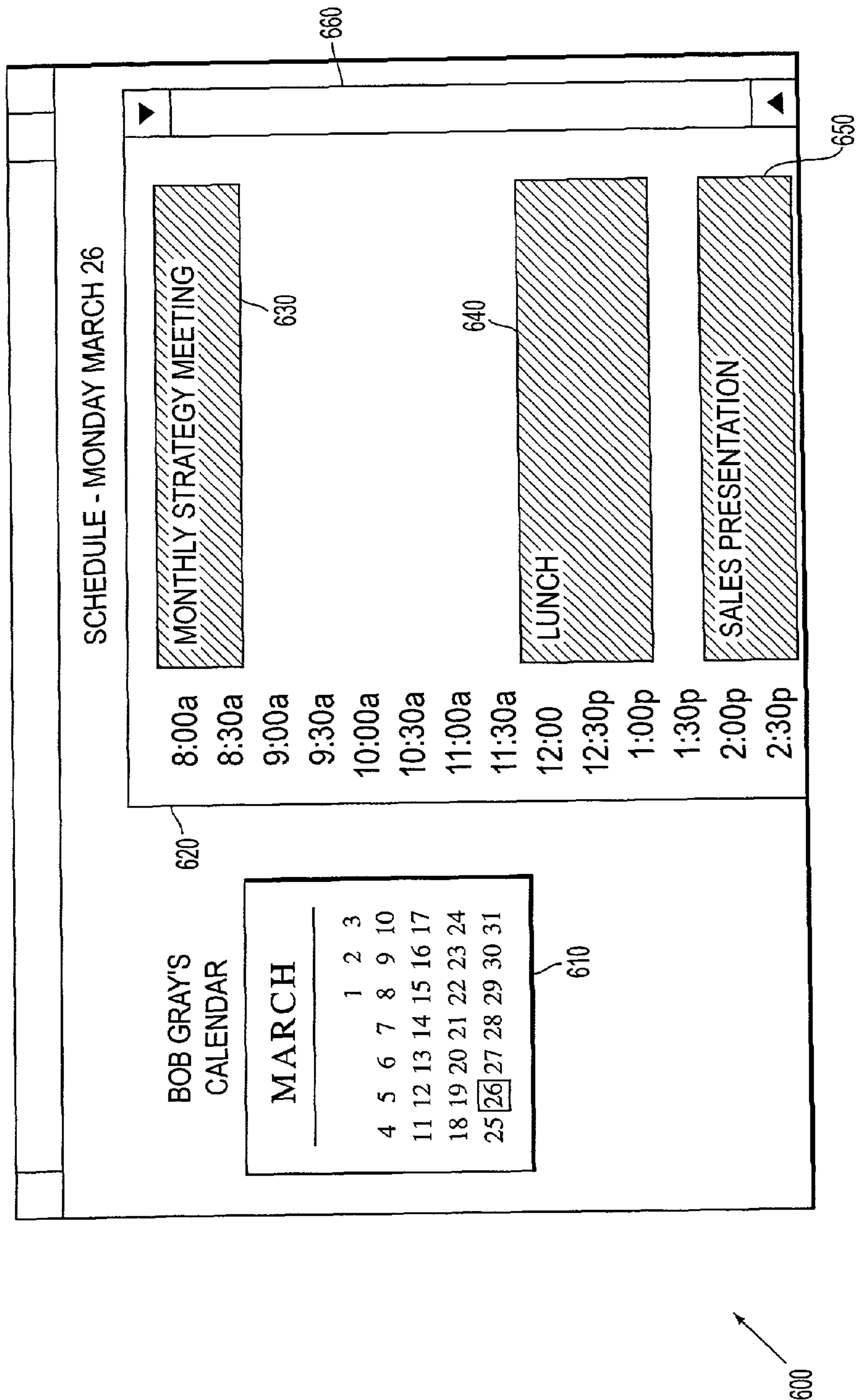

FIGS. 5 and 6 show an exemplary embodiment of calendar screens 500 and 600, respectively, that are usable to inform a user of the user's schedule during a particular time period. The exemplary calendar screens 500 and 600 respectively have month displays 510 and 610, and scheduled time highlight areas 530 and 540, and 630, 640, and 650, respectively, that indicate the time intervals that have associated events scheduled at those times. Furthermore, the calendar system screens 500 and 600 include scrollable bars 550 and 660, respectively, for allowing a user to scroll through various entries so that an entire list of such entries need not be displayed at any given time.

The exemplary calendar entry for "Fred Jones", as shown in FIG. 5, indicates that for Monday, March 26, there are two scheduled entries. The first scheduled time highlight area 530 shows a block of time scheduled between 8:00 a.m. and 8:30 a.m. and the second scheduled time highlight area 540 shows a block of time between 11:30 a.m. and 12:30 p.m. It should be noted that the time intervals that are not highlighted are currently unscheduled time.

Similarly, the calendar system screen 600, as shown in FIG. 6, indicates that the schedule for "Bob Gray" for Monday, March 26 has three scheduled entries. The first scheduled time highlight area 630 shows a block of time scheduled between 8:30 a.m. and 10:00 a.m. The second scheduled time highlight area 640 shows a block of time scheduled between 12:00 noon and 1:00 p.m. The third scheduled time highlight area 650 shows a block of time scheduled time between 2:00 p.m. and 2:30 p.m.

It should be appreciated that the calendar screens 500 and 600 shown in FIGS. 5 and 6 are presented here merely to illustrate how a calendar system may capture schedule information and how mutually available free time may exist between users (i.e., times or time intervals in which both users do not have anything scheduled). One skilled in the art would readily appreciate that there are various other ways to store and present schedule information. In general, any calendar system that is capable of storing schedule information for one or more persons and that allows such information to be retrieved may be used regardless of the manner in which this information is stored and/or retrieved and the format in which this information is input and/or visually or otherwise presented to one or more persons.

Figure 7:
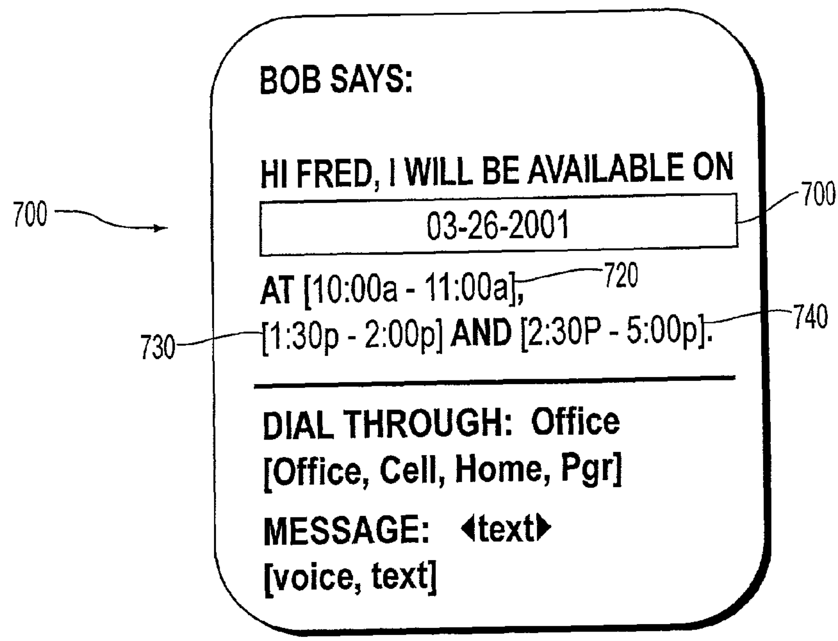
FIG. 7 shows an exemplary communication device illustrating an interaction space for negotiating a future communication with another party.

FIG. 7 shows an exemplary embodiment of a communication device 700 usable to negotiate a future communication. The exemplary communication device 700 has a text input box 710 usable to enter a date for which a future communication is desired, and time interval display areas 720, 730 and 740 usable to display the times or time intervals on the date that are mutually available as well as providing the capability of selecting one of these mutually available times or time intervals as the selected time interval for the future communication. It should be noted that a user must select only one of the time interval display areas 720, 730 and 740 and that no time intervals would be displayed if no mutually available times or time intervals were determined.

In an exemplary mode of operation, the communication device 700 can accept a date for future communication input into the text input box 710. The communication device 700 can validate the information input into the text input box 710 to ensure that the information entered is in the proper format for a date field and also that the date entered is a future date within a desired range. That is, the communication device 700 may be instructed to only accept dates that are not too far into the future if such validation is deemed desirable. Once the user has entered the appropriate date information into the text input box 710, the communication device 700 can create an appropriate negotiation request. This message may be sent from a first interaction manager, such as the interaction manager 130, associated with the requester to a second interaction manager, such as the interaction manager 180, for example.

Once the second interaction manager 180 receives the request for a future communication from the first interaction manager 130, the second interaction manager 180 can determine mutually available times or time intervals for the communication based on the date information entered into the text input box 710 by obtaining schedule information for the caller 110 and the callee 190. For example, the interaction manager 180 may determine the identifier of the caller 110 associated with the request, or which may be in the form of an identifier extracted from a cookie file, for example, or one that is explicitly provided. The identifier may be used to obtain the schedule information for the caller 110 for the desired date. Furthermore, the second interaction manager 180 may also obtain schedule information relating to the schedule of the callee 190 using the date information entered into the text input box 710. Once the lists of available times for each of the callee 190 and the caller 110 are obtained, a list of mutually available times can be determined.

For example, if the schedule information for the requester (e.g., the caller 110) matches the information shown in FIG. 5 and the schedule information for the recipient of the request (e.g., the caller 190) matches the schedule information shown in FIG. 6, the second interaction manager 180 would determine that there are three time intervals for which neither party has any scheduled activity, i.e., between 10 a.m. and 11 a.m., between 1:30 p.m. and 2:30 p.m., and between 2:30 p.m. and 5 p.m. As shown in FIG. 7, these time intervals of available free time are displayed on the communication device 700 under time interval selection display areas 720, 730 and 740. Once the user associated with the first interaction manager 130 (e.g., the caller 110) receives this information on the communication device 700, the user may select the desired time for the future communication from among the times displayed in the time interval selection display areas 720, 730 and 740.

Upon selecting the preferred time, the first interaction manager 130 associated with the communication device 700 can forward the selected time to the second interaction manager 180 for approval. The second interaction manager 180 can query the callee 190 whether the callee 190 wishes to accept the choice. If the callee 190 associated with the second communication manager 180 approves of the selected time for the future communication, then the schedule information associated with both the caller 110 and the callee 190 can optionally be updated to schedule the future communication.

It should be appreciated that, while the text input box 710 allows for a user to enter a single date, in various exemplary embodiments, a date range could also be utilized, such as, for example, a date range like March 26-29. Furthermore, it should be appreciated that the range of date information is not limited to consecutive days. Still further, the date information may comprise one or more future time ranges that are of any length (e.g., between 6 p.m. and 9 p.m. on a particular day or days). Finally, it should be appreciated that, in various exemplary embodiments, a date may not be necessary. For example, in these exemplary embodiments, a user would merely provide sufficient information indicating that a future communication is desired. Thus, the second interaction manager 180 would determine the mutually available times based on one or more criteria, such as, for example, within the next three business days, or in some other manner.

While the exemplary communication device 700 uses the text input box 710 and several selection areas 720-740, it should be appreciated that inputting and selecting various parameters, such as the date for future communication and the selected time period for the future communication, can be accommodated using a variety of devices, such as a number of graphical user interface selection widgets, check boxes, buttons, list boxes, pop-up or drop-down marks, text entry boxes and the like, or any other known or later-developed graphical or textual interface that an operator can access. It should also be appreciated that the communication device 700 can, in addition, or alternatively, include any device capable of receiving or defining a request for a future communication, such as a command line interface, a touch-sensitive display, a keyboard, or a number of mechanical selection elements, such as buttons and knobs, or the like, without departing from the spirit and scope of this invention.

Likewise, it should be appreciated that any of the display devices discussed herein that are used to convey information to a user can alternatively be implemented using devices that interact with the user in other human-perceptible ways, such as an auditory output device, a haptic (touch) output device, or any other known or later-developed device that has an output that can be perceived by a user.

Figure 8:
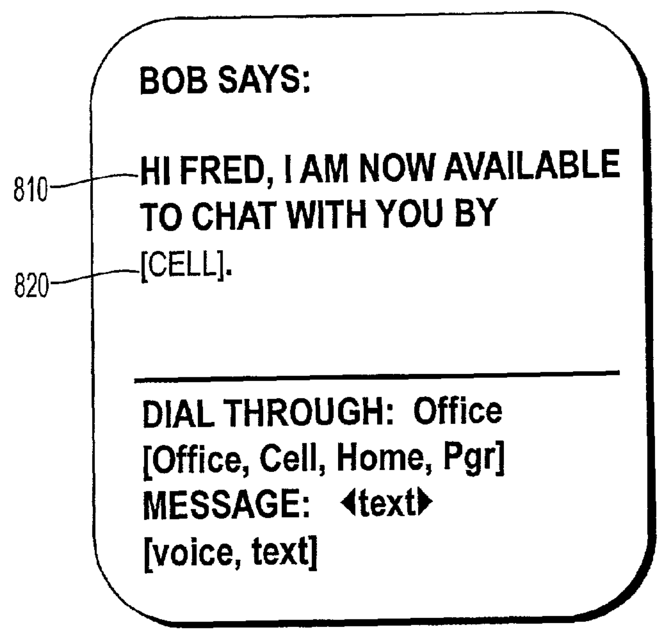
FIG. 8 shows an exemplary communication device illustrating the use of an interaction space for notifying a party that a preferred communication channel is available.

FIG. 8 shows an exemplary embodiment of a communication device interface 800 usable to schedule a deferred communication. The communication interface 800 includes a message area 810 usable to inform a caller that a particular communication channel is currently available and a communication channel area 820 usable to indicate that a particular communication channel is currently available.

In an exemplary mode of operation, the communication device interface 800 can be invoked when the second communication manager 190 determines that a selected communication channel has become available. For example, a caller 110 interacting with a first communication device may cause the first interaction manager 130 to send a request for the deferred communication to the second interaction manager 180. Alternatively, the first interaction manager 130 may automatically send the request for deferred communication in response to an indication from the second interaction manager 180 that the callee is unavailable.

The request for a deferred communication may involve the second interaction manager 180 waiting a specified or predetermined period of time until a particular communication channel, such as, for example, a pager, a cellular telephone or the like, becomes available. If the communication channel becomes available within the waiting period, the second interaction manager 180 may send a message back to the first interaction manager 130 indicating the availability of the desired communication channel. In response, the first interaction manager 130 may cause the communication device interface 800 to display an appropriate message indicating that the communication device has become, or is currently, available.

In addition, the caller 110 associated with the first communication manager 110 may select the displayed communication channel by selecting the communication device area 820 using a pointing device, such as, for example, a mouse device. Once the caller 110 associated with the first interaction manager 130 has selected the communication device area 820, the first interaction manager 130 may then send an acceptance message to the second communication manager 180 notifying the second communication manager 180 that a communication over the indicated communication channel should take place.

Figure 9:
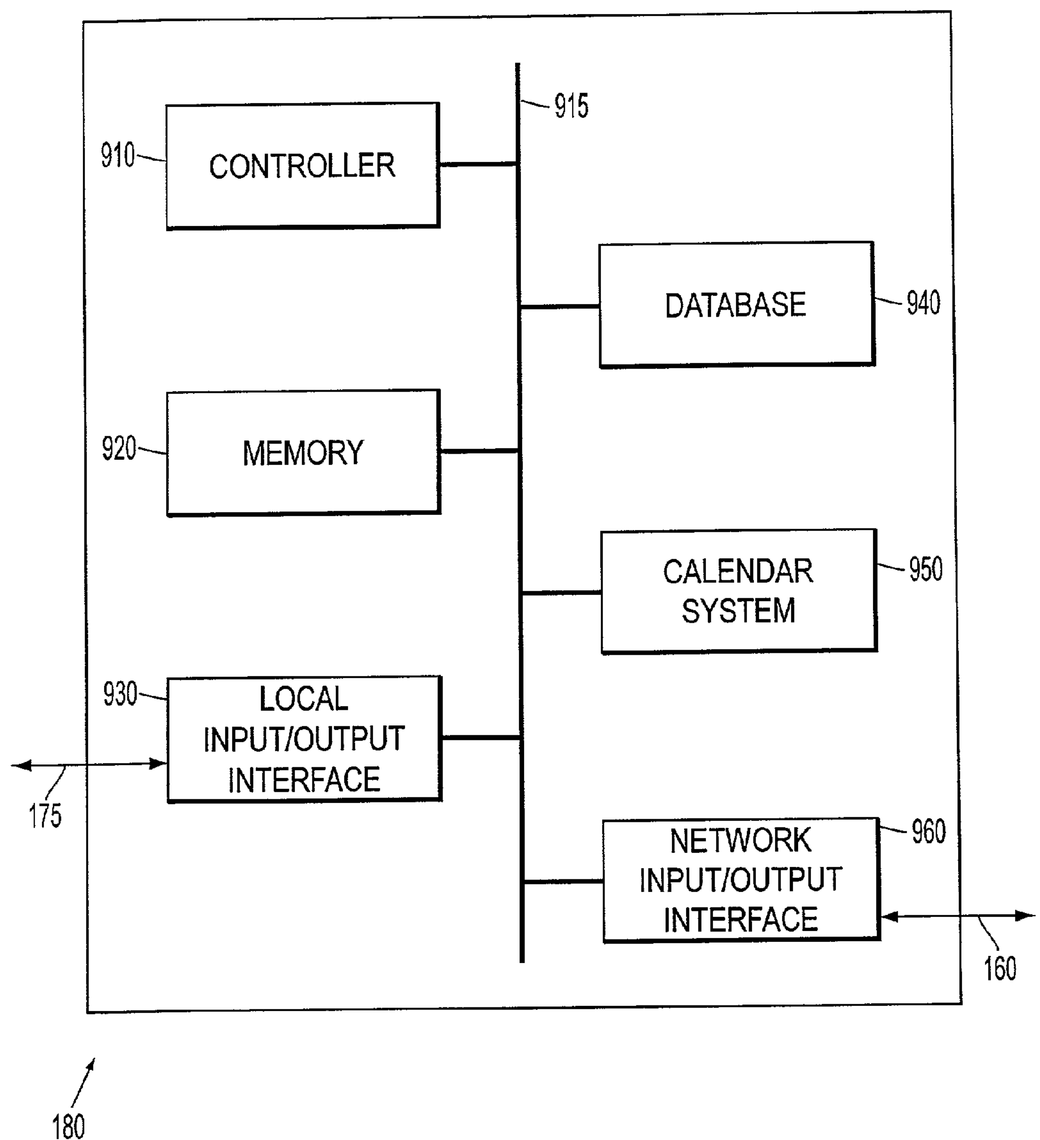
FIG. 9 is an exemplary block diagram of an interaction manager shown in FIG. 1.

FIG. 9 is a block diagram of a hardware system, a software system or a combined hardware/software system usable to implement a first exemplary embodiment of the second interaction manager 180. As shown in FIG. 9, in this first exemplary embodiment, the second interaction manager 180 includes a controller 910, a memory 920, a local input/output interface circuit or routine 930, a database 940, a calendar system 950, and a network input/output interface circuit or routine 960. The controller 910 can be linked to the other devices 920-960 by the data/control bus 915.

In a first mode of operation, the controller 910 receives an interaction request via the network input/output interface 960 and stores this information in the memory 920. Once the interaction request has been stored, the controller 910 then determines an identifier associated with the interaction request. The identifier can be extracted from the interaction request itself or, alternatively, obtained via information stored outside the interaction manager 180. For example, the controller 910 may interact with an automatic number identification (ANI) system to obtain caller ID regarding the caller. The identifier may also be extracted from a cookie file associated with the caller's webphone or personal computer, for example.

Once the controller 910 has determined the identify of the caller, the controller 910 then can determine the interaction information to be provided to this caller. The controller 910 can query the database 940 for information relating to the caller, using the caller identifier. For example, the database

940 may be a relational database in which information relating to various callers is stored in tables. Furthermore, the caller identifier may serve as a key or index value to one or more of such tables.

The database 940 can include a variety of information usable by the interaction manager 180 to determine and create an appropriate interaction space 200 for the caller. For example, the caller may be a friend of the callee. In this case, the callee may have registered the caller as a friend in the database 940. If the caller is registered as a friend in the database 940, the controller 910 can provide an appropriate level of information to the caller via the local input/output interface 930.

The controller 910 may also use other information to determine an appropriate decision for providing interaction information. For example, the controller 910 may access the database 940 and/or obtain further information that the callee is currently in an important meeting. For example, the controller 910 may query via the calendar system 950 to determine the present availability of the callee. The schedule information might show that the callee is currently in a meeting.

For example, the controller 910 might determine that the status of the meeting is of high importance based on the social context of the meeting. For instance, the meeting as shown in the calendar information might be taking place in the Board room. Thus, the controller 910 might determine this meeting is of very high importance to the callee. Consequently, the controller 910 might limit the amount of interaction information to be provided to most callers during the time when this meeting is taking place. Thus, the controller 910 might only provide a general message as to the unavailability of the callee for the duration of the meeting. However, the callee might provide his or her pager number to a caller who has a high access level.

If the database 940 does not have an entry for the caller, a generic interaction space may be displayed or otherwise presented to the caller. For example, the caller may not be acquainted with the callee and there might not be any information in the database 940 regarding this caller. Since there is no preexisting relationship between the caller and the callee, the access level may be considered low.

Once the interaction information is displayed to the caller, the caller may have the option of either presently interacting with the callee or arranging for a future interaction. For example, the interaction manager associated with the callee may present interaction information to the caller indicating that the callee is in a meeting. In this case, the caller may wish to arrange for a future communication with the callee. Likewise, the interaction information presented to the caller may indicate that the callee is currently using a particular communication device, such as, for example, a cell phone, and the caller may be presented with the option to defer the communication on the preferred communication channel until the desired communication channel becomes available. However, even if the interaction information presented to the caller indicates that the callee is currently available, the caller may still elect to negotiate a future communication with the caller and/or request a deferral of a communication until a desired communication channel becomes available. In various exemplary embodiments, a request to negotiate a future communication and/or a request for a deferred communication may be processed without first receiving an interaction request.

In a first mode of operation, the controller 910 can receive a request for future communication via the network input/output interface 960 and store the request for future communication in the memory 920. This request for a future communication may be separate than the other requests that are received or may be combined with them. The interaction manager 180 may already know the identity of the caller from the original interaction request if an interaction request and/or a request for deferred communication was received previously.

The controller 910 may utilize the desired date information for a future communication from the request for future communication stored in the memory 920. Using this date information, the controller 910 may obtain schedule information from the calendar system 950 to determine a mutually available time for the future communication.

Assuming that the request is accepted, the controller 910 can access the calendar system 950 using the identifiers of the caller and the callee to obtain schedule information to determine mutually available times. For example, the calendar system 950 may contain schedule information for each day of a particular month. Furthermore, the schedule information for a particular day may be obtained for both parties to determine any coincidental free time. This coincidental free time may then be formatted as a list of mutually available times and sent via the network input/output interface 960 to the first interaction manager 130 for display to, and selection by, the requester.

The communication device associated with the first interaction manager 130 may display the list of times of mutually available time for the requester to select. As shown in FIG. 8, the communication device may display this information so that the caller can select a portion of the screen having a hypertext link to select an appropriate time, for example.

Once the caller has made the appropriate selection, a response may be sent back to the second interaction manager 180. Upon receiving the response via the network input/output interface 960, the controller 910 can thereupon store this request in the memory 920. At this point, the requester has selected a desired time from a list of mutually available times for a future communication and the selected desired time may be displayed by the second interaction manager 180 on the second communication device.

For example, the controller 910 may direct that an appropriate message be displayed to the communication device of the callee 110 via the local input/output interface 930 and the callee 190 may then decide whether to accept the suggested time as the time for a future communication. Optionally, the callee 190 may counter with other desired time(s) for a future communication. In this manner, the parties may perform "back and forth" negotiation for a future communication until both parties find a desirable time for the interaction.

Assuming that the callee 190 has accepted the time for a future communication selected by the caller 110, the controller 910 can update the calendar system 950, or cause it to be updated, to reflect the now-scheduled future communication. That is, the calendar system 950 may be updated such that the selected time for the future communication is shown for both parties in each of their respective personal calendars.

In various exemplary embodiments, the controller 910 is implemented using a programmed general purpose computer. However, in other exemplary embodiments, the controller 910 can be implemented using a programmed special purpose computer, a programmed microprocessor or microcontroller, an ASIC or other integrated circuit, a digital signal processor, a hard-wired electronic or logic circuit such as a discrete element circuit, a programmable logic device such as a PLD, PLA, FPGA or PAL, or the like, without departing from the spirit and scope of this invention.

The memory 920 can be implemented using static or dynamic RAM. However, the memory 920 can also be implemented using a floppy disk and disk drive, a writable optical disk and disk drive, a hard disk drive, flash memory or the like without departing from the spirit and scope of this invention. Furthermore, the memory 920 can be a non-volatile memory or a volatile memory.

In various exemplary embodiments, the local input/output interface circuit or routine 930 and/or the network input/output interface circuit or routine 960 can be hard-wired interfaces. However, in other exemplary embodiments, the local input/output interface circuit or routine 930 and/or the network input/output interface circuit or routine 960 can be any device suitably used to transmit information to and from another device, such as a universal asynchronous receiver/transmitter (UART), a local area network (LAN), a wide area network (WAN), a parallel digital interface, a software interface or any combination of known or later-developed software elements and/or hardware elements. While the local input/output interface circuit or routine 930 and the network input/output interface circuit or routine 960 are depicted as separate devices in FIG. 9, it should be appreciated that the input and output functions can be accommodated by either a single device or by separate devices, without departing from the spirit and scope of this invention.

In various exemplary embodiments, the database 940 can be implemented using a single database management system (DBMS) managed by the controller 910 and residing on a memory, such as a hard disk. However, it should be appreciated that the database 940 can be implemented on one or more separate computer systems. For example, the database 940 can reside on a separate computer system and/or a server having a relational database capable of executing SQL instructions. The calendar system 950 can be any calendar or scheduling system or software application capable of providing and storing information relating to scheduled events or activities associated with a particular person or group of people. For example, the calendar system 950 may include entries and associated time intervals in which activities or events for one or more persons may take place during these time intervals. It should be appreciated that the information stored in the calendar system 950 may be stored in various types of computer systems, including personal digital assistants (PDA's) residing on one or more computer systems or otherwise implemented.

The exemplary local input/output interface circuit or routine 930 can include a software module capable of generating hypertext mark-up language (HTML) code to provide screen output capable of being viewed over the Internet by the caller 110 or the callee 190 having a suitable Web browser, such as, for example, Microsoft Internet Explorer, Netscape Navigator/Communicator or the like. However, it should be appreciated that the local/output interface circuit or routine 930 may instead produce an audio report that can be played to the caller 110, such as, for example, over the telephone. Further, it should be appreciated that any type of known or later-developed output generation device or technique can be used to provide information to the caller 110, such as an electro-mechanical printing device, various displays and the like, without departing from the spirit and scope of the present invention.

In a second mode of communication, the controller 910 can receive a request for deferred communication via the network input/output interface circuit or routine 960 and store this request in the memory 920. Furthermore, the controller 910 can generate a message via the local input/output interface circuit or routine 930 linked via the link 175 to a communication device (not shown) associated with the callee 190 indicating a request for deferred communication over a particular communication channel has been received. The caller 110 may choose either to accept the request for deferred communication or decline the request. Alternatively, the request for deferred communication may be automatically accepted or declined by the second interaction manager 180 based on predefined or determined criteria, such as that based upon the relationship between the caller 110 and the callee 190 and/or the current status of the callee 190.

Assuming that the request for deferred communication has been accepted, the controller 910 can wait a predetermined or specified length of time until the indicated communications channel has become available. If the communication channel is not available at the end of the waiting period, the controller 910 can send a notification that the request is unsatisfied, via the network input/output interface 960, to the first interaction manager 130. However, if the indicated communication channel becomes available within the waiting period, the controller 910 can send a notification to the first interaction manager 130 via the network input/output interface 960 to the effect that the channel is now available. When the caller 110 receives notification that the communication channel is available, the caller 110 may elect to interact with the callee 190 over this communication channel. As shown in FIG. 8, the user may select the communication channel by clicking on a hypertext link, for example.

Figure 10:
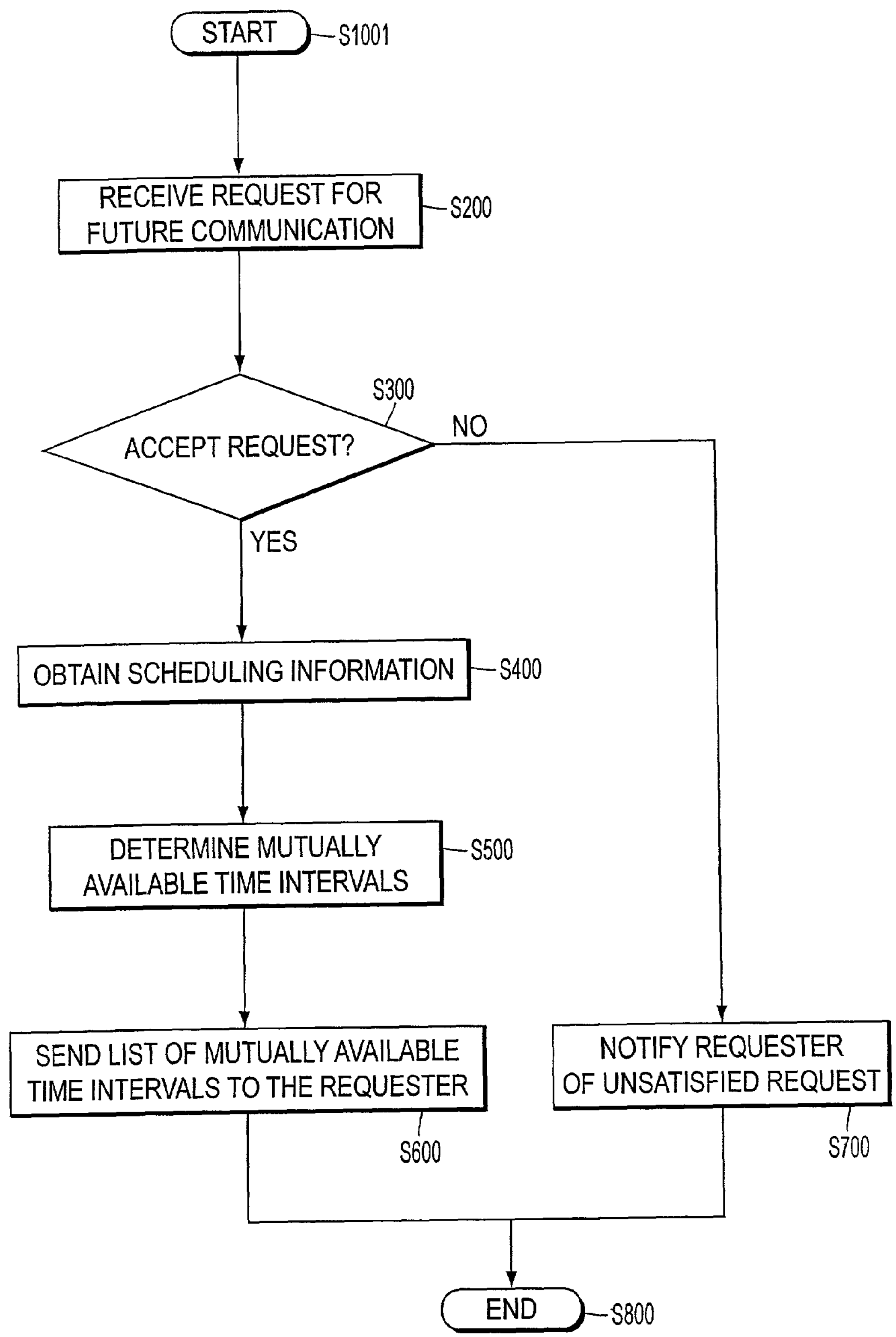
FIGS. 10-12 depict flowcharts outlining techniques for requesting a future communication and requesting a deferred communication.

FIG. 10 is a flowchart outlining a first exemplary embodiment of a technique for processing a request for a future communication. Beginning in step S100, operation continues to step S200, where a request for a future communication from a first interaction manager is received by a second interaction manager. The request may include the caller's identity, communication device and mode of communication. In this exemplary embodiment, a caller may contact the callee's interaction manager using a Web-enabled telephone (a webphone). The callee's interaction manager can be resident on a hypertext transfer protocol (HTTP) server.

Next, in step S300, a determination is made as to whether to accept the request for a future communication. If the callee accepts the request or, alternatively, the interaction manager associated with the callee makes this itself determines to accept the request, operation continues to step S400. Otherwise, operation jumps to step S700.

In step S400, schedule information is obtained from one or more calendar systems for both the caller and the callee. This may involve querying various information systems using the requested date or periods associated with the request. For example, the schedule information for a particular date range may be obtained for both the caller and the callee and stored in a memory area. Next, in step S500, mutually available times for the caller and the callee are determined from the obtained schedule information for both the caller and the callee. This may be accomplished by comparing a list of times and associated scheduled or free time for both the caller and the callee. For those intervals on which there is free time coinciding with both the caller and the callee, mutually available times are indicated.

Then, in step S600, a list of mutually available times is formatted and sent to the requester. Operation then jumps to step S800. In contrast, in step S700, a notification to the requester of an unsatisfied request is formatted and delivered to the requester. Operation then continues to step S800, where the method ends.

Figure 11:
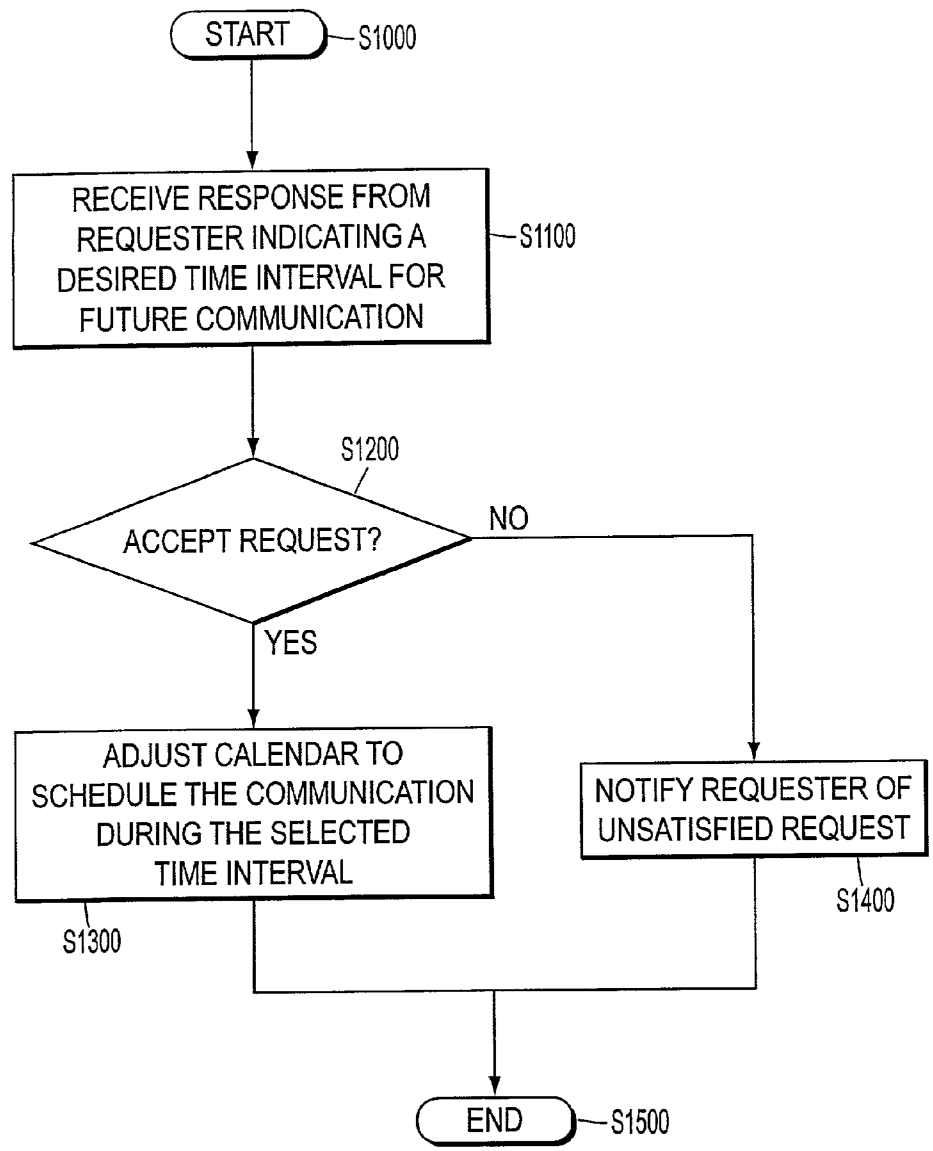

FIG. 11 is a flowchart outlining a first exemplary embodiment of a technique for processing a desired time selection for a future communication. Beginning in step S1000, operation continues to step S1100, where a response message is received from the requester indicating a desired time for future communication. This response message from the requester may include the requester's identifier, desired communication mode, and selected desired time for the future communication.

Then, in step S1200, a determination is made as to whether to accept the selected time for future communication. For example, the selected time for a future communication may be displayed on a communication device associated with the caller. In this case, the caller may elect to accept the response or decline the response. If the caller accepts the time for future communication, operation continues to step S1300. Otherwise, operation jumps to step S1400. In step S1300, the calendar systems associated with the caller and the callee may be adjusted to schedule the future communication during the selected time. Operation then jumps to step S1500. In contrast in step S1400, the requester is notified of an unsatisfied request. Operation then continues to step S1500, where the method stops.

Figure 12:
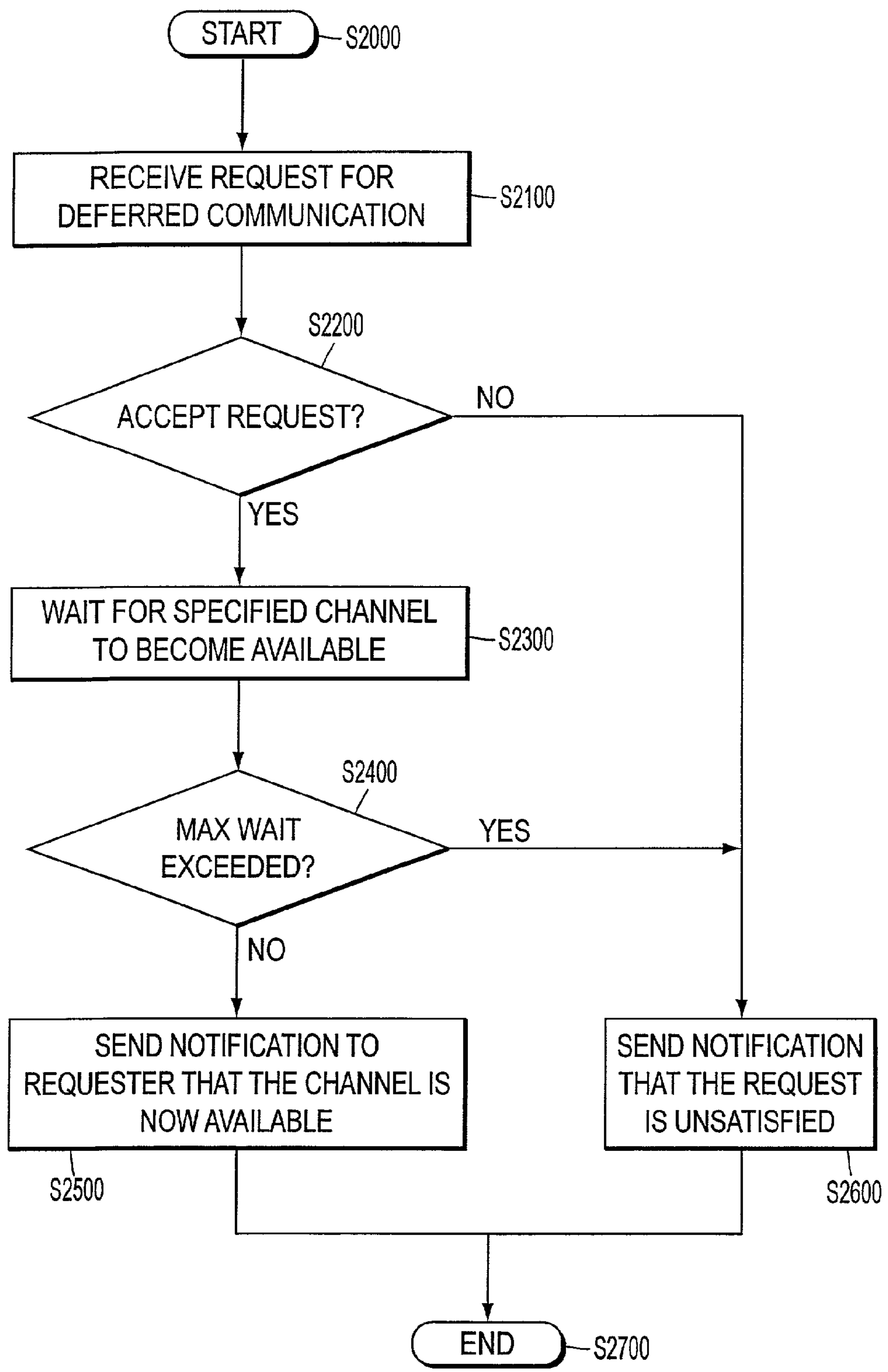

FIG. 12 is a flowchart outlining a first exemplary embodiment of a technique for processing a request for deferred communication. Beginning in step S2000, operation continues to step S2100, where a request for deferred communication is received by a second interaction manager. The request for deferred communication may include information relating to the caller's identity, communication device and desired mode of communication. In addition, the information received from the caller may include a maximum time period for which to defer the communication. Alternatively, a predefined maximum time period may be used.

Next, in step S2200, a determination is made as to whether to accept the request. The interaction manager associated with the callee may query the callee via the callee's communication device as to whether the communication may be deferred until an available communication device or channel becomes available. Alternately, the decision may be made without the direct intervention of the callee, for example, by employing criteria based on the relation between the caller and the caller and/or the status of the callee. If the request is accepted, operation continues to step S2300. Otherwise, operation jumps to step S2600.

In step S2300, the second interaction manager waits for a specified channel to become available. In this case, the second interaction manager may periodically poll an operating system component associated with the desired communication device or channel to determine if that communication device or channel is currently available. Alternatively, the second interaction manager may simply wait until it receives an indication that the preferred communication device or channel is available. For instance, when the callee disconnects from a communication device or channel, the second interaction manager may be provided with an indication from a network that the communication device or channel is currently available.

Then, in step S2400, a determination is made as to whether the maximum waiting period is exceeded. The maximum time period may be a predetermined time period or may be provided by the callee, or even by the caller, who may set the maximum waiting period value, for example, by using a preferences selection screen. If the maximum waiting period is not exceeded, operation continues to step S2500. Otherwise, operation jumps to step S2600. In step S2500, a notification is sent to the requester that the desired communication device or channel is now available. Operation then jumps to step S2700. In contrast, in step S2600, the caller is sent a notification that the request is unsatisfied. Then, in step S2700, the method stops.

In various exemplary embodiments, the systems and methods of this invention can be implemented using a general purpose computer system. However, the systems and methods of this invention can be implemented using any number of one or more programmed general purpose computers, programmed microprocessors or micro-controllers and peripheral integrated circuit elements, ASIC, or other integrated circuits, digital signal processors, hard-wired electronic or logic circuits such as discrete element circuits, programmable logic devices such as a PLD, PLA, FPGA or PAL, or the like. In general, any device capable of implementing a finite state machine that is in turn capable of implementing the flowcharts shown in FIGS. 10-12 and/or the interaction manager shown in FIGS. 1 and/or 9, can be used to implement the systems and methods of this invention.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of negotiating, in real time, a future time for a future communication between a caller and a callee, the method as viewed by the caller comprising:

sending a first request for a future communication to an interaction management system of the callee;

wherein if the first request is accepted by the interaction management system of the callee, obtaining electronic schedule information from electronic calendar systems of the caller and callee, determining a list of mutually available free times between electronic calendar systems of the caller and callee, presenting the list to both the caller and callee, and facilitating real time negotiation between the caller and callee for selecting the future time for the future negotiation, wherein if the first request is rejected by the interaction management system of the callee, receiving, from the callee, one or more options for limited present interaction with the callee responsive to a present availability of the callee and to an access level of the caller to the callee; and establishing a limited present electronic communication with the callee during periods when the present availability of the callee is low using the one or more options;

wherein the present availability is low if the callee is attending an important meeting, wherein the access level is based on a preexisting relationship between the caller and the callee, the preexisting relationship being determined from a database coupled with a device of the callee, the database including entries for a plurality of potential callers identified by the database as being acquaintances of the callee, and wherein the options for limited present interaction include a pager number, a telephone number and an email address of the callee.

2. The method of claim 1, further comprising:

wherein if the callee is currently attending a meeting of high importance, limiting an amount of interaction information to be provided to the caller for a duration of the meeting.

3. The method of claim 2, wherein the electronic schedule information includes a plurality of times, each time being either free time having no scheduled activity expected to take place at that time or scheduled time having at least one scheduled activity expected to take place at that time.

4. The method of claim 2, wherein facilitating the negotiation further comprises negotiating, in real time, between an interaction manager associated with the caller and an interaction manager associated with the callee.

5. The method of claim 4, further comprising:

sending the interaction manager associated with the caller a list of at least one occasion of mutually-available free time;

displaying at least one time from the list of at least one occasion of mutually-available free time on the interaction manager associated with the caller; and selecting a desired time for future communication from among the displayed at least one occasion of mutually-available free time in response to an input from the caller.

6. The method of claim 5, further comprising sending an indication to the second interaction manager indicative of the selected preferred time for future communication.

7. The method of claim 2, wherein the schedule information is capable of being limited based on a relationship between the caller and the callee.

8. A system of interaction management for negotiating, in real time, a future time for a future communication, the system being implemented in a device adapted for being used by the caller or by the callee, the system comprising:

an input and output interface for sending and receiving a first request for a future communication, the first request being sent by the caller and being received by the callee;

a database including entries for a plurality of potential callers for each callee, the potential callers identified by the database as having a preexisting relationship with the callee by being acquaintances of the callee;

an electronic calendar system for maintaining schedule of a user of the device, the user being a caller or a callee;

a controller coupled to the input and output interface, the database and the electronic calendar system, the controller controlling the device to perform operations of:

sending the first request for the future communication to the interaction management system of the callee, wherein if the first request is accepted by the interaction management system of the callee, the interaction management systems of the caller and callee determines a list of mutually available free times between the electronic calendar systems of the caller and callee and presents the list to both the caller and callee, and facilitating real time negotiation between the caller and callee for selecting the future time for the future negotiation, wherein if the first request is rejected by the interaction management system of the callee, receiving, from the callee, one or more options for limited present interaction with the callee responsive to a present availability of the callee and to an access level of the caller to the callee, and establishing a limited present electronic communication with the callee during periods when the present availability of the callee is low using the one or more options;

wherein the access level is based on the preexisting relationship between the caller and the callee determined from the database, and wherein the options for limited present interaction include a pager number, a telephone number and an email address of the callee.

9. The system of claim 8, wherein wherein if the callee is currently attending a meeting of high importance, an amount of interaction information to be provided to the caller is limited for a duration of the meeting by the controller.

10. The system of claim 9, wherein the input interface obtains the electronic schedule information from the electronic calendar system for at least one of the caller and the callee.

11. The system of claim 10, wherein the electronic schedule information includes a plurality of times, each time being one of free time having no scheduled activity expected to take place within that time or scheduled time having at least one scheduled activity expected to take place within that time.

12. The system of claim 9, wherein the schedule information is capable of being limited based on a relationship between the caller and the callee.

* * * * *